No. 633,760. Patented Sept. 26, 1899.
W. C. JENNINGS.
STEAM SEPARATOR.
(Application filed Dec. 17, 1898.)
(No Model.)

Witnesses
M. Wright
H. Watson.

Inventor
William C. Jennings
By R. C. Wright
His Attorney

UNITED STATES PATENT OFFICE.

WILLIAM C. JENNINGS, OF CAMDEN, NEW JERSEY, ASSIGNOR TO THE WATSON & McDANIEL COMPANY, OF PHILADELPHIA, PENNSYLVANIA.

STEAM-SEPARATOR.

SPECIFICATION forming part of Letters Patent No. 633,760, dated September 26, 1899.

Application filed December 17, 1898. Serial No. 699,538. (No model.)

*To all whom it may concern:*

Be it known that I, WILLIAM C. JENNINGS, a citizen of the United States, residing at Camden, in the county of Camden and State of New Jersey, have invented certain new and useful Improvements in Down-Current Vertical Separators; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to mechanism to separate steam or other gaseous fluids from the liquid they may have absorbed or become saturated with while being generated and from after condensation. The act of ebullition, as in raising steam, results in a certain amount of absorption of the liquid by the vapor, and condensation returns the fluid to its former liquid state, and unless freed from such liquid the efficiency of the vapor or fluid is impaired and damage follows the introduction of the liquid into the mechanism operated or actuated by the fluid.

To accomplish the desired object of my invention, I have constructed a separator in manner to be interposed between the source of product and use of the fluid, as between a steam-boiler and a steam-engine, and change the direction of the fluid flowing in a space within the separator, wherein it may expand and release the suspended or saturating liquid by precipitation, and the reversing of the current hold it in a receptacle where it may in proper time be removed, while allowing the anhydrous fluid to arise and freely flow to its operative mechanism. I attain these objects by the mechanism illustrated in the accompanying drawings, in which—

Figure 1:
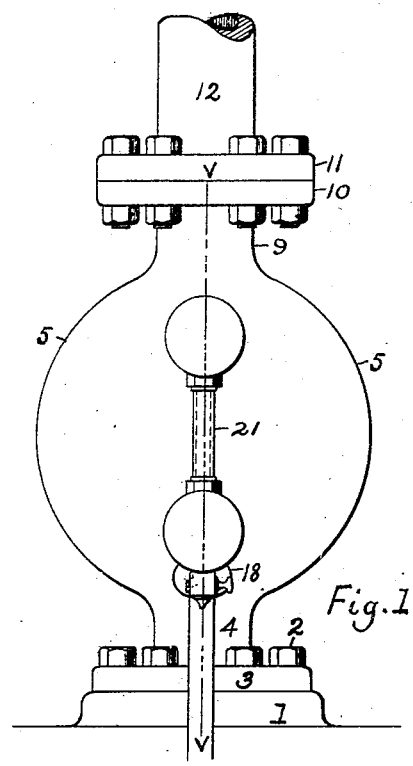
Figure 2:
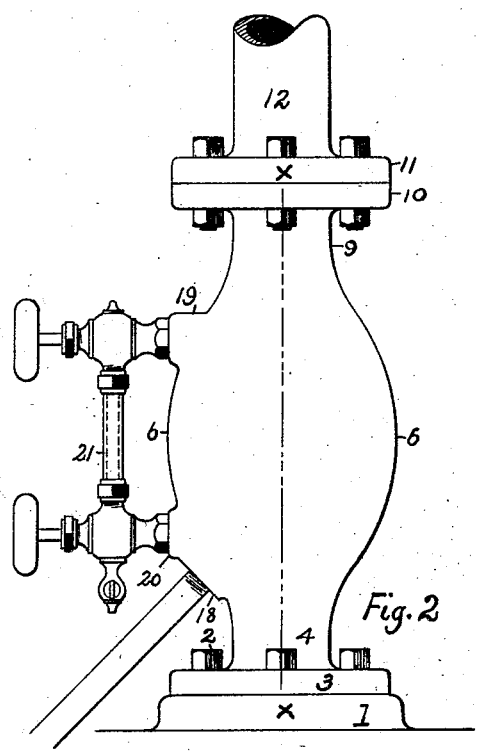
Figure 3:
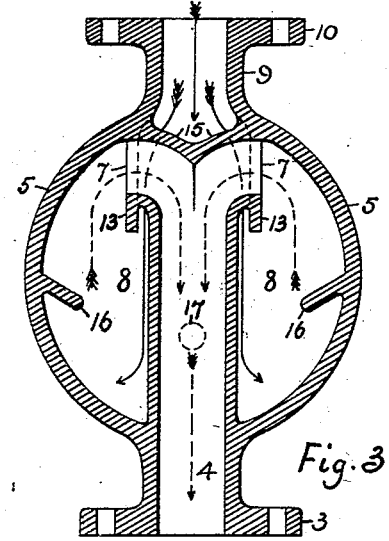
Figure 4:
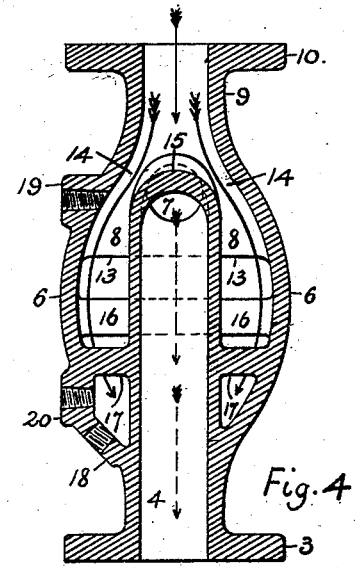
Figure 5:
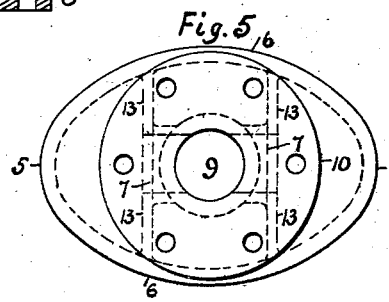

Figure 1 is a side elevation. Fig. 2 is an edge elevation. Fig. 3 is a vertical central section on line *x x*, Fig. 2. Fig. 4 is a vertical central section on line *v v*, Fig. 1. Fig. 5 is a top view.

Similar figures of reference indicate similar parts throughout the views.

In Figs. 1 and 2 I have shown my separator attached directly to the steam-chest of a steam-engine 1 by tap-bolts 2 through flange 3, which in this method forms a supporting-base. Upwardly from flange 3 is a vertical pipe 4, passing within the separator-walls 5 5 6 6, and at its upper end closed, but lower down bifurcated, and terminating in side openings 7 within the separator and toward walls 5 5 and near the upper part of the separator interior 8. The walls 5 5 6 6 are attached to pipe 4 some distance above flange 3, walls 5 5 being circular in form and above pipe 4 terminating in a receiving-pipe 9, surmounted by a flange 10, to which is connected flange 11 of pipe 12, which is a portion of the connection from the steam-boiler or other fluid-generator to the separator. Walls 6 6 are attached to delivery-pipe 4 at the same height as walls 5 5 and terminate at the same height on pipe 9, which is formed above walls 5 5 6 6. The walls 5 5 6 6 are shaped and conjoined to each other to form a body-case for the separator, flattened to an elliptical shape as viewed from the top and edge, and circular as viewed from the side, making a form occupying a minimum of space, presenting a large surface for the expansion of the entering fluid, a direct course for the fluid in its exit, and no abrupt or tortuous passages to prevent free flowing or the obstruction of the fluid.

Across the separator-body, at its upper interior part, are vertical walls or partitions 13, placed at right angles to openings 7, connected at their ends to walls 6, at their top to walls 5, and extending outward and downward from openings 7 and forming between them passage-ways 14 from inlet-pipe 9 over top 15 of pipe 4 toward the insides of walls 6, thus preventing and directing the incoming fluid to the enlarged and flattened surface provided for its expansion and the release of its suspended or absorbed liquid following the direction of the full-line arrows. Thereafter the fluid rises, following the course indicated by the broken-line arrows through openings 7 into delivery-pipe 4, and thence to ultimate destination exterior to the separator.

To prevent any of the liquid deposit from being forced or drawn up by the fluid and carried along in its outward passage, I have constructed ledges or dams 16, projecting into body 8 from walls 5 and connected to walls 6 to intercept such flow.

Walls 6 and pipe 4 are connected by stays 17 to insure stability and more firmly unite the parts, as the construction shown in the illustrations is such as I employ when making the separator of cast metals and of integral parts; but it will readily be understood that in some instances and for some sizes it may be advantageous or desirable to construct the separator of separable parts united in other well-known manners of construction, and such means I consider within my invention when they embody the features I have set forth.

A boss 18 is formed at the base of the liquid-reservoir to enable the attachment of a cock, valve, pipe, or other means to withdraw the deposited liquid at proper times, while bosses 19 20 are also attached and open into the body part 8 to enable the attachment of glass-gage 21 to indicate the amount of liquid deposit, to prevent its rise above a point where it is liable to pass into pipe 4, and the time to empty the reservoir or receptacle.

I claim—

1. A separator having a body circular in form at its upper and lower ends and cross-sections which are elongated elliptically, an inlet-pipe above the body, an outlet-pipe partially within and partially without the body, the outer part having a flange forming a base whereon to rest the separator, and the inner part passing within the body to near its top, the top of the pipe being closed, and bifurcated, with openings in the bifurcations, and walls surrounding the bifurcation-openings, also attached to the case, and forming guided ways from the inlet-pipe mouth, over the outlet-pipe end and down its sides toward the lower inner part of the body, in manner and form substantially as set forth.

2. A separator, the body of which is circular in form viewed from the side elevation and elliptical in its vertical and cross sections, an inlet-pipe at the top of the case, an outlet-pipe extending within the case to near its top and having oppositely-faced openings below its closed top, partitions surrounding the openings and extending outwardly and downwardly therefrom and connected at their top and ends to the case, forming passageways, from the inlet-pipe, over and down the outlet-pipe and directed toward the flattened or elliptic walls of the separator-case, and below the partitions surrounding the outlet-pipe openings, substantially as set forth.

3. In a separator a circular chamber elliptically formed as to its vertical and cross sections, an inlet-pipe at its upper part, an outlet-pipe at its lower part which thereafter extends upwardly within the case, having multiple openings into the case but closed at its top, partitions joined to the case, surrounding the outlet-pipe openings, and forming passage-ways from the inlet-pipe to the interior of the case, over the upper end of the outlet-pipe and for a distance down its sides and below its openings, and ledges or dams within the case and attached thereto at their ends and one edge, substantially as and for the purposes set forth.

4. A separator having a circular body part as viewed from the side, but elliptically elongated in its vertical and horizontal cross-sections, an inlet-pipe thereto entering the body part and at the mouth of said inlet-pipe, and joined to the body part, partitions or vertical walls joined also to the upper closed end of an outlet-pipe having side openings communicating with the upper circular part of the case, and also surrounding these side openings, and thereby forming guided courses to cause the incoming vapor to pass over the end and down the sides of the outlet-pipe and against the elongated and flattened sides of the case before being admitted to the openings in the outlet-pipe communicating with the exit from the separator, substantially as described.

In testimony whereof I affix my signature in presence of two witnesses.

WILLIAM C. JENNINGS.

Witnesses:
LEWIS H. REDNER,
R. C. WRIGHT.

It is hereby certified that in Letters Patent No. 633,760, granted September 26, 1899, upon the application of William C. Jennings, of Camden, New Jersey, for an improvement in "Steam-Separators," an error appears in the printed specification requiring correction, as follows: In line 90, page 1, the word "preventing" should read *presenting;* and that the said Letters Patent should be read with this correction therein that the same may conform to the record of the case in the Patent Office.

Signed, countersigned, and sealed this 10th day of October, A. D., 1899.

[SEAL.]
WEBSTER DAVIS,
*Assistant Secretary of the Interior.*

Countersigned:
C. H. DUELL,
*Commissioner of Patents.*